Nov. 28, 1967   O. J. B. ORWIN   3,354,834
CONVEYORS FOR CONVEYING GOODS
Filed April 22, 1965   5 Sheets-Sheet 1
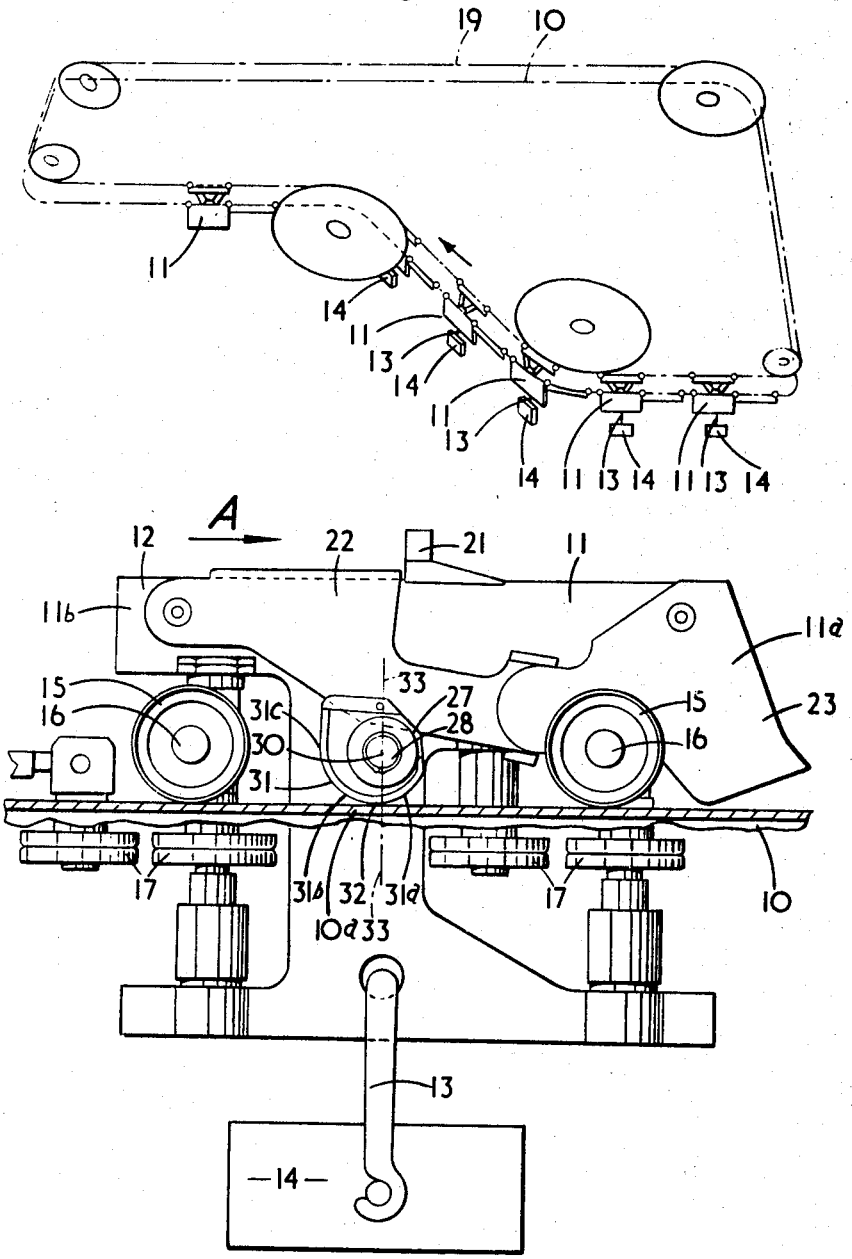
INVENTOR.
OLAF JOHN BARCLAY ORWIN
BY Kurt Kelman
AGENT

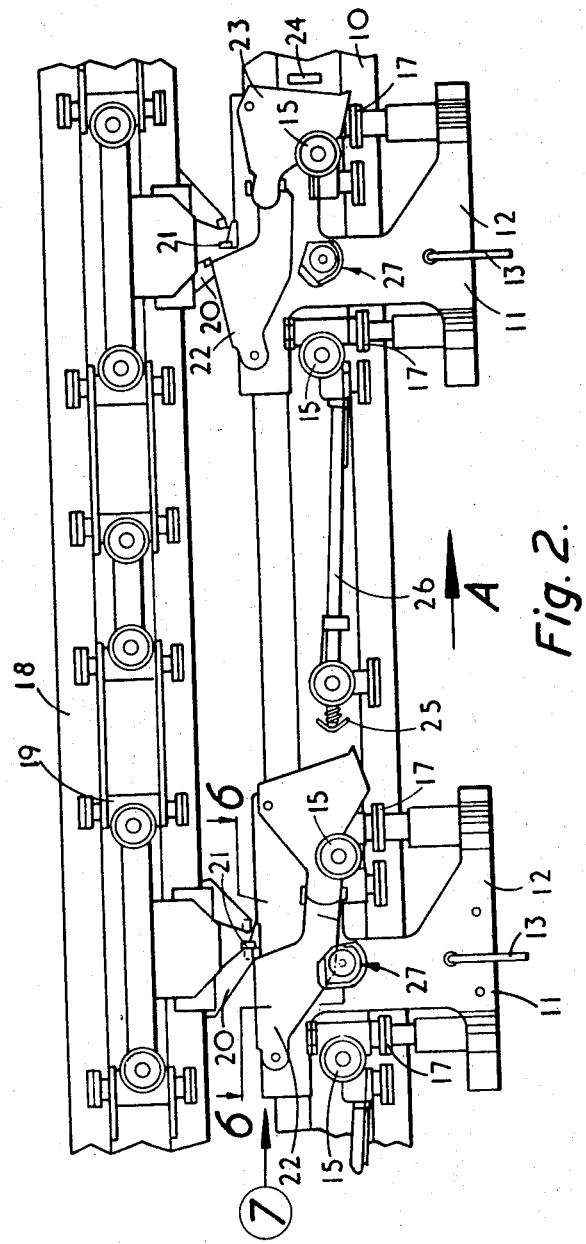

Nov. 28, 1967   O. J. B. ORWIN   3,354,834
CONVEYORS FOR CONVEYING GOODS
Filed April 22, 1965   5 Sheets-Sheet 3

INVENTOR.
OLAF JOHN BARCLAY ORWIN
BY Kurt Kelman
AGENT

Nov. 28, 1967   O. J. B. ORWIN   3,354,834
CONVEYORS FOR CONVEYING GOODS
Filed April 22, 1965   5 Sheets-Sheet 4
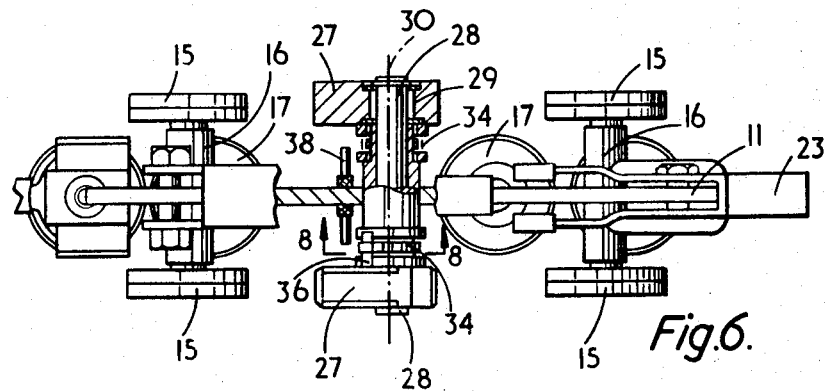
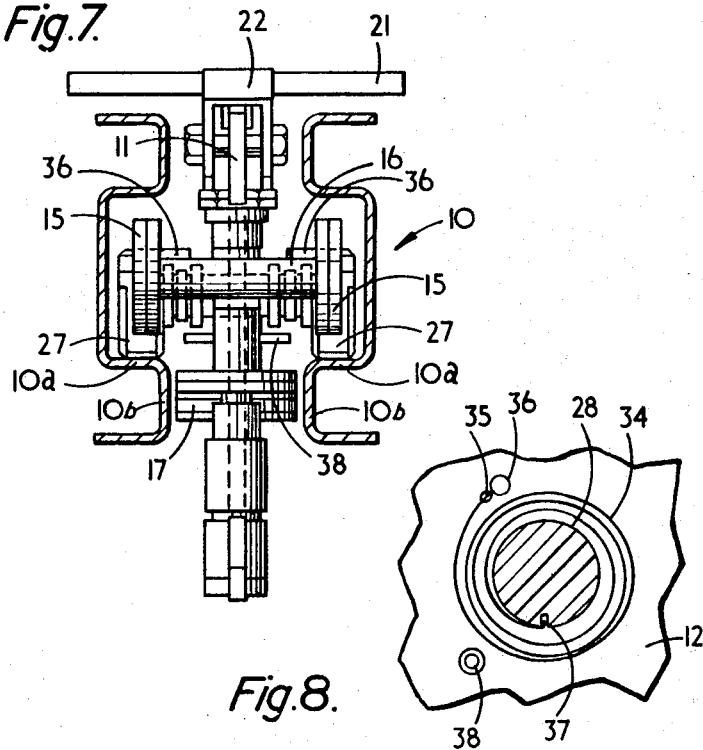
INVENTOR.
OLAF JOHN BARCLAY ORWIN
By Kurt Kelman
AGENT United States Patent Office 3,354,834
Patented Nov. 28, 1967

3,354,834
CONVEYORS FOR CONVEYING GOODS
Olaf John Barclay Orwin, Quinton, Birmingham, England, assignor to Fisher & Ludlow Limited, Tipton, England, a British company
Filed Apr. 22, 1965, Ser. No. 450,063
Claims priority, application Great Britain, May 9, 1964, 19,424/64
8 Claims. (Cl. 104—172)

ABSTRACT OF THE DISCLOSURE

This invention relates to conveyors for goods of the kind comprising wheeled trolleys advanceable along a supporting track and is concerned with the provision of track engaging means on the trolleys for automatically preventing the same from moving in a reverse direction opposite to the intended direction of advancement.

This invention relates to conveyors for conveying goods of the kind, herein referred to as the kind specified, comprising a trolley track having an upwardly directed load supporting face, a powered trolley driving element, one or more load carrying trolleys supported by said load supporting face of the track, and adapted to be advanced along the track by said driving element, with means for disconnecting the drive from said driving element to the trolleys to permit of the latter being brought to rest at selected positions along the length of the trolley track.

In conveyor systems of the foregoing kind when the drive is disconnected to a particular trolley, under certain circumstances there is a tendency for the trolley to move rearwardly, i.e. in a direction the reverse of its designed direction. This may occur for example, in the event that the track is slightly uphill in the direction of trolley advancement. It may also occur on level track more especially where, as is commonly the case, the load is suspended from the trolleys, so as to be free to oscillate relative to the trolleys in a fore-and-aft direction, which the load naturally tends to do under its own momentum in the event that the advancing trolley is suddenly brought to rest.

The foregoing tendency for the trolleys to move rearwardly when the drive from the conveyor chain or other driving element is disconnected, is liable to cause collision between two successively advancing trolleys or their loads, so as to damage the same.

Also in the event of the trolleys moving rearwardly, the drive disconnecting means is liable to be so operated as undesirably to engage the drive to such trolley from the next successively advancing dog or other trolley driving means on the trolley driving element such as an endless chain.

Thus the designed operation of the conveyor is interfered with, with the result that the advancement of the trolleys is no longer a controlled advancement and serious damage to the conveyor and/or to the load can readily occur.

The present invention has for its object the provision of an improved and simple arrangement for preventing this undesired reverse movement of the trolleys.

According to the present invention each of the trolleys has mounted thereon for pivotal movement about an axis transverse to the direction of advancement of the trolleys, a cam member having a cam face of convexedly curved configuration adapted frictionally to engage with an upwardly directed part of the trolley track, said trolley track engaging cam face in a circumferential direction along the length thereof, which is rearwardly of the trolley, being spaced by a progressively increasing distance from the axis of pivoting of the cam member, so that the part of the convexedly curved cam face which is in contact with the upwardly directed face of the trolley track is at all time situated to the rear of a vertical plane containing said axis of pivoting, considering the track horizontal, the arrangement being such that trolley advancement in normal forward direction is not restrained by the cam member, while in the event of the trolley moving rearwardly, the cam member rolls on said part of the trolley track and pivots relative to the trolley in a direction to engage with said track part at positions on the cam face which are at progressively increasing distances from the axis of pivoting to thereby raise the loaded trolley and apply to the cam member a couple derived from the weight of the trolley and load acting in a direction to resist said rearward trolley movement.

In this specification the expressions "front" and "rear" and "forward" and "rearward" have reference to the designed direction of advancement of the trolleys along their supporting trolley track.

One embodiment of the present invention is illustrated in the accompanying drawings, wherein:

FIGURE 1 is a perspective view of one form of conveyor of the kind specified embodying the present invention;

FIGURE 2 is a side elevation to an enlarged scale of part of the conveyor depicted in FIGURE 1 and showing two successively advancing trolleys with the advancement of the first trolley already arrested and the advancement of the second or following trolleys about to be arrested;

FIGURE 3 is a side elevation to an enlarged scale of part of one of the trolleys depicted in FIGURE 2, showing in more detail one of the trolley cam members when in its disengaged position;

FIGURE 6 is a cross sectional plan view to an enlarged scale of one of the trolleys depicted in FIGURE 2, the section being taken on the line 6—6 of FIGURE 2;

FIGURE 7 is an end view of one of the trolleys depicted in FIGURE 2 looking in the direction of the arrow 7 in that figure and showing the position of the parts with the cam members in a position to restrain rearward movement of the trolley;

FIGURE 8 is a detailed sectional view to an enlarged scale on line 8—8 of FIGURE 7 showing the form of one cam member spring means;

Figure 4:
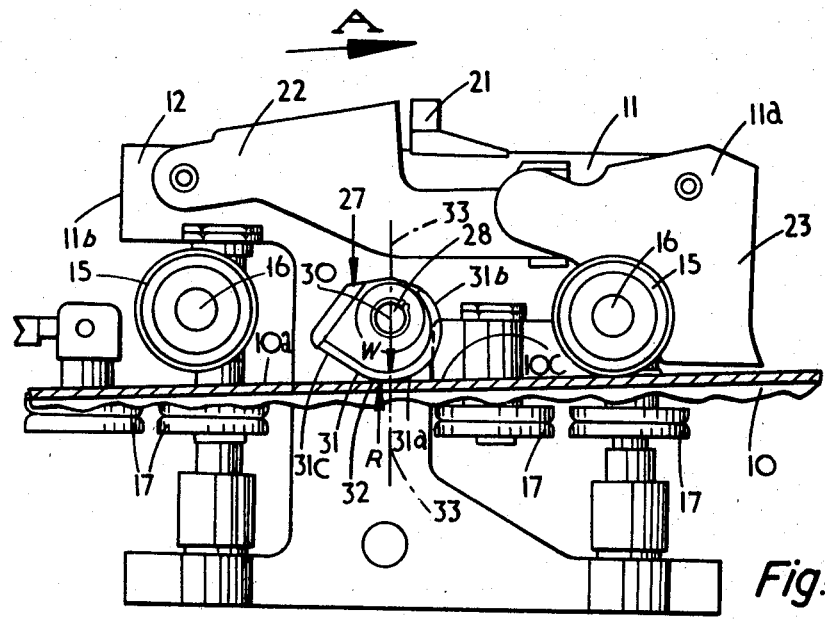
FIGURE 4 is a view similar to FIGURE 3, but with one of the trolley cam members depicted in a position in which it is in a rotational position for inhibiting rearward movement of the trolley.

Referring to the drawings, the conveyor there illustrated comprises a trolley track 10 of cruciform configuration in cross section, as shown in FIGURE 7, so as to provide horizontal and vertical flanges 10a, 10b, the former of which presents an upwardly directed load supporting face 10c and supports a number of wheeled trolleys 11 adapted to be advanced along the track 10. Each trolley 11 comprises a body 12 having pivotally connected thereto for pivotal movement in a plane parallel to the direction of advancement of the trolley, a dependent suspension hook 13, the lower end of which is adapted to support goods indicated diagrammatically at 14, the arrangement being such that in the event of the trolley being suddenly stopped, the goods are free to oscillate to a limited extent in a fore-and-aft direction relative to the trolley, thereby reducing the impact loading on the suspension hook 13.

The trolley body 12 is in the form of a generally flat plate, which at the front and rear ends 11a, 11b respectively of each trolley is provided with a pair of load supporting wheels 15 mounted for free rotation on spindles 16 extending perpendicularly transverse to the direction of advancement of the trolley and adjacent each pair of load supporting wheels 15, the trolley is provided with a pair of guide wheels 17, rotatable about a vertical axis. The wheels 15 and 17 respectively engage the horizontal and vertical flanges 10a, 10b of the trolley track 10.

Disposed vertically above the trolley track 10 and in spaced parallel relation thereto, is a chain track 18 also of cruciform configuration in cross section and which supports a powered trolley driving element in the form of an endless chain 19.

This chain is provided in the known manner with trolley driving dogs 20, which are adapted for driving engagement with trolley driving bars 21, mounted on the trolley body 12. Each driving dog 20 is liftable relative to the chain 19 from the trolley driving position depicted in the lefthand side of FIGURE 2 into the drive disengaged position depicted in the righthand side of that figure, such raising of the dogs 20, being effected by dog lifting mechanism 22 provided on each trolley. As this forms no part of this invention it is sufficient to say that each dog lifting mechanism incorporates a striker member 23 at the front end of each trolley, which is displaceable in a rearward direction relative to the trolley if engaged by some form of stop 24, as depicted in the righthand side of FIGURE 2, or by the rear end 25 of a tail 26 provided on the rear end of each trolley 11, so that if as shown in FIGURE 2, the trolleys are advancing in the direction of the arrow A in that figure, and the drive to the first of these trolleys is disconnected by stop 24 engaging striker member 23, so that the first trolley is brought to rest, the drive to the second trolley is disconnected by engagement of tail end 25 with the striker member of the following or second trolley.

When the advancing trolleys 11 supporting the goods 14 are suddenly brought to rest in this way, e.g. for the purpose of unloading the goods from the trolleys, there is a natural tendency for the arrested trolley to at once move in the opposite i.e. rearward direction, such rearward movement being assisted by the fore-and-aft oscillation of the goods 14 relative to the trolleys. This is taken care of in accordance with the present invention, by providing each trolley with a pair of cam members 27 which engage with the horizontal flanges 10a of the trolley track 10 and provide resistance to rearward movement of the trolleys.

The two cam members 27 are mounted on each trolley for pivotal movement about a horizontal axis which is perpendicularly transverse to the direction of advancement of the trolleys, by providing the trolley body 12 at a position half way between the front and rear pair of load supporting wheels 15 with a shaft 28, which projects on opposite sides of the plate-like body. Opposite ends of each shaft engage pivotally within a bore 29, formed in each of the cam members 27, so that each cam member is free to pivot about the central axis 30 of shaft 28. The foregoing disposition of the shaft 28 between the two pairs of load supporting wheels 15 enables a substantial proportion of the total weight of the trolley and load effectively to be transmitted to the cam members to restrain rearward movement of the trolleys as herein described.

As best shown in FIGURES 3 and 4 each cam member 27 is of generally disc-like shape and of convexedly curved configuration on its periphery which accordingly provides a convexedly curved cam face 31 which is adapted to engage frictionally with one of the two horizontal load supporting flanges 10a forming part of the trolley track 10.

Figure 9:
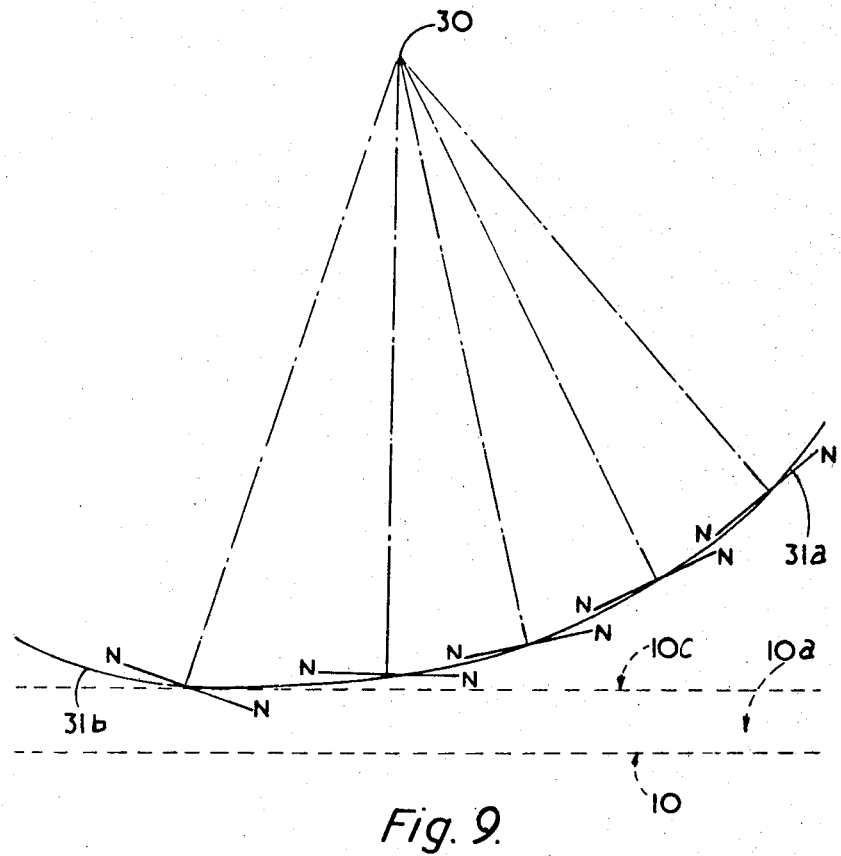
FIGURE 9 is a diagrammatic view showing to an enlarged scale the configuration of part of the cam face of one of the cam members.

As best shown in FIGURE 9 each convexedly curved cam face 31 along the underside of each cam member and in a circumferential direction which is rearwardly of the trolley, is of progressively increasing radial distance from the axis of pivoting of the cam member 27, so that the part 31a of the convexedly curved cam face 31 which is in contact with the upwardly directed face 10c of the trolley track is in contact with such face at a position 32 which considering the track horizontal is situated rearwardly of the vertical plane 33 containing the axis of pivoting 30 of the cam members.

For the normal, i.e. forward direction of trolley advancement indicated by arrow A, and with the underside of cam face 31 in contact with trolley track flange 10a, the lower part of the cam member 27 will tend to roll on flange 10a in a rearward direction relative to shaft 28, i.e. the cam member will tend to rotate in a clockwise direction as viewed in FIGURE 2, i.e. in a direction for bringing parts of the cam face of lesser diameter towards the trolley track flange 10a. Thus trolley advancement in the normal direction is not resisted by the cam members 27 which then remain in the angular position depicted in FIGURE 3.

In the event of the trolley 11 tending to move in a rearward direction opposite to its direction of advancement, the lower part of the cam member 27 now tends to roll in a forward direction relative to shaft 28, i.e. anti-clockwise as viewed in FIGURE 2, so that parts 31b of each cam face which are situated progressively further from the pivotal axis 30, are, as shown in FIGURE 4, brought progressively into engagement with track flange 10a.

The effect of this is necessarily to at once slightly raise the trolley 11 and load supported therefrom relative to the track 10 and thus to lift out of contact with the track 10 the pair of load supporting wheels 15 nearest to the track engaging part of the cam faces 31, i.e. the rear pair of wheels 15. Thus a substantial proportion of the weight of the trolley and load is now transmitted through each cam face 31 onto the adjacent track flange 10a.

Thus as shown in FIGURE 7 the cam member shaft 28 now applies to the cam members 27 in the vertical plane 33, a downwardly acting force W equal to the proportion of the weight of the trolley and load now carried by the cam members, which latter are subjected to an upward reaction force R from the track of the same magnitude as that of force W but acting on the part of the cam face 31 momentarily in contact with the track at a position to the rear of the position of application of force W. Thus, the cam members 27 are at once subjected to a couple acting in a clockwise direction in the drawing and tending to roll the cam members forwardly along the track so as to apply a forwardly directed thrust to the trolley resisting its rearward movement, which thrust is proportionate to the mass of the trolley and load. Thus the greater the rearward momentum of the trolley consequent on the mass of the trolley and load the greater the resistance which is provided, to such rearward movement.

The progressive increase in the radial distance of the cam face 31 from the pivotal axis 30 is made sufficiently small as to ensure absence of skidding between the customary mild steel surface of the track 10 and the cam face 31 which is of hardened steel to minimise wear. This requires, referring to FIGURE 9, that the continuously curved track engaging cam face 31 should at any position along the length thereof be inclined at not more than about 8° and desirably not more than 5° to a line (N—N in FIGURE 9) lying in the plane of pivoting of the cam member and normal to the radius line passing through such position and the pivoted axis 30. Such angle of 5° to 8° is slightly less than the angle of friction between surfaces of material, as above described. Such inclination is made as large as possible to give the maximum lift to the trolley consistent with absence of slip as the cam member rolls on the track rearwardly as aforementioned and thus ensures that the trolley moves rearwardly to the minimum extent. In theory the circumferential length of the cam face 31 need only be very small for this purpose, corresponding to an angular distance about axis 30 of the order of 45°, but to take care of irregularities in the track in a vertical sense arising from manufacturing imperfections, the length of the cam face 31 corresponds to an angular distance of about 150° to 180°. Also by providing a cam face 31 of this greater length as illustrated, a greater proportion of the energy in the rearwardly moving trolley is dissipated in raising the trolley and its load through a greater distance.

Figure 5:
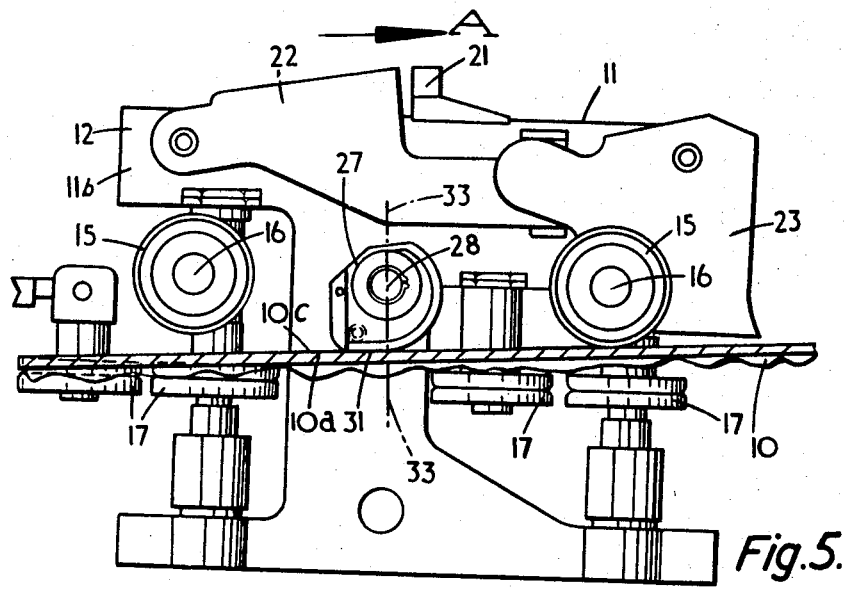
FIGURE 5 is a view similar to FIGURE 4, but showing the position of the cam member in the event of a violent rebound of the trolley taking place.

In order effectively to take care of even the most severe rearward movements of the trolleys 11, the part 31a of each cam face 31 which is situated the maximum distance from the axis of pivoting 30, is continued around the periphery of the cam member 27 into a flat face 31c which is adapted to have skidding i.e. sliding engagement with track flange 10a, when the cam member is rotated in an anti-clockwise direction through an angle of about 80° into the position depicted in FIGURE 5. In this position the same substantial proportion of the weight of the trolley and load is transmitted through the cam members, i.e. through the flat faces 31c. Thus if the energy arising from the reverse momentum in the trolley is not wholly dissipated in lifting the trolley, the remaining energy is absorbed by skidding the flat cam face 31c along the track 10.

Each cam member 27 is self engaging with trolley track 10 as by reason of the progressively increasing radial distance of face 31 from axis 30, its centre of gravity will be on the rear side of the pivotal axis 30. However, such self engaging action is preferably assisted by providing each cam member with a light spring which applies a very light couple tending to rotate the cam member about shaft 28 in a direction opposite to the direction in which the cam member tends to be rotated by engagement with track 10 during normal trolley advancement. Thus the cam member is maintained in light contact with the track during forward movement of the trolley, thereby ensuring that immediately the trolley commences to move rearwardly the cam members will commence to roll on the track in a direction to resist such rearward movement as above described. Preferably as shown in FIGURE 8, such spring comprises a flat spiral spring 34 disposed between each cam member and the adjacent side of trolley body 12. One end 35 of each spring 34 is anchored to pin 36 extending transversely from the adjacent side of the cam member and the other end 37 of the spring is anchored to cam member shaft 28.

For the spring 34 to be effective it must be stressed at all times and unwinding of the spring by rotation of the cam members in an anti-clockwise direction, substantially beyond the FIGURE 3 position, e.g. when the trolley is removed from the track, is positively prevented by the engagement of each pin 36 with opposite ends of a stop pin 38 extending transversely through the trolley body 12.

What I claim then is:

1. A conveyor for conveying goods, comprising a trolley track having an upwardly directed load supporting face, a powered trolley driving element, a plurality of load carrying trolleys of said trolleys having a plurality of load supporting wheels the undersides of which are in engagement with said load supporting face of the track, said trolleys being adapted to be advanced along the track by said driving element, means for disconnecting the drive from said driving element to the trolleys, each of said trolleys having mounted thereon for pivotal movement about an axis transverse to the direction of advancement of the trolleys, a cam member having a downwardly directed cam face of convexedly curved configuration adapted frictionally to engage with an upwardly directed part of the trolley track, means biasing said cam face into frictional engagement at all times with said upwardly directed part of the trolley track, said trolley track engaging cam face in a circumferential direction along the length thereof which is rearwardly of the trolley being spaced by a progressively increasing distance from the axis of pivoting of the cam member, so that the part of the convexedly curved cam face which is in contact with the upwardly directed face of the trolley track is at all times situated to the rear of a vertical plane containing said axis of pivoting, considering the track horizontal.

2. A conveyor for conveying goods, comprising a trolley track having an upwardly directed load supporting face, a powered trolley driving element, a plurality of load carrying trolleys each of said trolleys having a plurality of load supporting wheels the undersides of which are in engagement with said load supporting face of the track, said trolley being adapted to be advanced along the track by said driving element, means for disconnecting the drive from said driving element to the trolleys, each of said trolleys having mounted thereon for pivotal movement about an axis transverse to the direction of advancement of the trolleys, a cam member having a downwardly directed cam face of convexedly curved configuration adapted frictionally to engage with an upwardly directed part of the trolley track, means biasing said cam face into frictional engagement at all times with said upwardly directed part of the trolley track, said trolley track engaging cam face in a circumferential direction along the length thereof which is rearwardly of the trolley being spaced by a progressively increasing distance from the axis of pivoting of the cam member, so that the part of the convexedly curved cam face which is in contact with the upwardly directed face of the trolley track is at all times situated to the rear of a vertical plane containing said axis of pivoting, considering the track horizontal, and each cam face in the direction in which its distance increases progressively from the axis of pivoting merges into a plane face of the cam member adapted to have sliding friction engagement with said part of the trolley track.

3. A conveyor according to claim 1, wherein the trolley track is formed in mild steel and the convexedly curved cam face is formed of hardened steel, characterised in that the said track engaging cam face is of continuously curved configuration with the surface thereof at any position along the length thereof inclined at between 5° and 8° to a line lying in the plane of pivoting of the cam member and normal to the radius line passing through such position and through the axis of pivoting of the cam member.

4. A conveyor according to claim 1, and wherein each trolley is provided with two pairs of track engaging load supporting wheels spaced apart along the length of the trolley, characterised in that a pair of said cam members are provided intermediate the two pairs of load supporting wheels, the two cam members of each pair being mounted for pivotal movement about a common horizontal axis perpendicular to the direction of trolley advancement.

5. A conveyor according to claim 2, and wherein each trolley is provided with two pairs of track engaging load supporting wheels spaced apart along the length of the trolley, characterised in that a pair of said cam members are provided intermediate the two pairs of load supporting wheels, the two cam members of each pair being mounted for pivotal movement about a common horizontal axis perpendicular to the direction of trolley advancement.

6. A conveyor according to claim 4, and wherein the trolley comprises a body of plate-like configuration with the plane of the plate substantially vertical, characterised in that the cam members are each of disc-like configuration and the trolley body at a position intermediate the two pairs of load supporting wheels carries a horizontal shaft extending perpendicularly transverse to the plane of the plate-like body with a cam member mounted pivotally on each end of the shaft.

7. A conveyor according to claim 1, characterised in the provision of spring means in association with each cam member acting to rotate the latter about its axis of pivoting in a direction opposite to its self-disengaging direction to maintain the cam member in light frictional engagement with said part of the trolley track during the normal forward direction of advancement of the trolley.

8. A conveyor according to claim 6, characterised in the provision of spring means in association with each cam member acting to rotate the latter about its axis of pivoting in a direction opposite to its self-disengaging direction to maintain the cam member in light frictional engagement with said part of the trolley track during the normal forward direction of advancement of the trolley, and said spring means comprising a flat spiral spring one end of which is anchored to the cam member and the other end of which is anchored to the associated horizontal shaft.

References Cited

UNITED STATES PATENTS 3,200,768   8/1965   Harrison _____ 104—172

ARTHUR L. LA POINT, *Primary Examiner.*

D. F. WORTH, *Assistant Examiner.*